United States Patent [19]
Nozaki et al.

[11] Patent Number: 5,921,889
[45] Date of Patent: Jul. 13, 1999

[54] AUTOMOTIVE CONTROL APPARATUS INCLUDING MEANS FOR PREVENTING INTERFERENCE BETWEEN RUNNING STABILITY CONTROL DEVICE AND TRANSMISSION SHIFT CONTROL DEVICE

[75] Inventors: Kazutoshi Nozaki, Toyota; Hiroji Taniguchi, Okazaki; Hideo Tomomatsu, Nagoya, all of Japan

[73] Assignee: Toyota Jidosha Kabushiki Kaisha, Toyota, Japan

[21] Appl. No.: 08/939,506

[22] Filed: Sep. 29, 1997

[30] Foreign Application Priority Data

Oct. 4, 1996 [JP] Japan .................................. 8-264824

[51] Int. Cl.$^6$ .......................... B60K 41/26; F16H 61/02; F16H 61/06; F16H 61/10
[52] U.S. Cl. .............................. 477/158; 477/97; 477/161
[58] Field of Search ............................. 477/97, 143, 156, 477/158, 161; 701/65

[56] References Cited

U.S. PATENT DOCUMENTS

| | | |
|---|---|---|
| 5,113,718 | 5/1992 | Sato . |
| 5,191,953 | 3/1993 | Ito et al. . |
| 5,405,301 | 4/1995 | Yagi et al. . |
| 5,569,117 | 10/1996 | Kono et al. . |
| 5,759,134 | 6/1998 | Kuriyama ................................ 477/158 |
| 5,813,936 | 9/1998 | Kichima et al. . |

FOREIGN PATENT DOCUMENTS

| | | |
|---|---|---|
| 61-88058 | 5/1986 | Japan . |
| 63-270962 | 11/1988 | Japan . |
| 1-261547 | 10/1989 | Japan . |
| 3-117773 | 5/1991 | Japan . |
| 3-249467 | 11/1991 | Japan . |
| 4-191562 | 7/1992 | Japan . |
| 4-266538 | 9/1992 | Japan . |
| 5-71626 | 3/1993 | Japan . |
| 6-307528 | 11/1994 | Japan . |
| 8-142715 | 6/1996 | Japan . |

*Primary Examiner*—Khoi Q. Ta
*Attorney, Agent, or Firm*—Oblon, Spivak, McClelland, Maier & Neustadt, P.C.

[57] ABSTRACT

Automotive vehicle control apparatus including a running stability control device for reducing engine output and/or applying brake to vehicle wheels for improving vehicle running stability, a shift control device for shifting an automatic transmission by engagement of at least one hydraulically operated frictional coupling device, depending upon a detected vehicle running condition as compared with a predetermined shift boundary pattern, a running stability control detecting device for detecting an operation of said running stability control device, and one of (a) a coupling pressure control device for controlling a hydraulic pressure of the frictional coupling device to be engaged to shift the automatic transmission, such that a rate of rise of the hydraulic pressure is lower when the operation of running stability control device is detected by the running stability control detecting device, than when the operation of the running stability control device is not detected, and (b) a shift point changing device for changing a shift point determined by the shift boundary pattern, when the operation of the running stability control device is detected.

6 Claims, 9 Drawing Sheets

FIG. 2

| SHIFT LEVER | TRANSMISSION | SOLENOID VALVES | | | CLUTCHES | | | BRAKES | | | |
|---|---|---|---|---|---|---|---|---|---|---|---|
| | | S1 | S2 | SLU | C0 | C1 | C2 | B0 | B1 | B2 | B3 |
| D | 1st | O | X | X | O | O | X | X | X | X | X |
| D | 2nd | O | O | △ | O | O | X | X | X | O | X |
| D | 3rd | X | O | △ | O | O | O | X | X | O | X |
| D | O/D | X | X | △ | X | O | O | O | X | O | X |
| 2 | 1st | O | X | X | O | O | X | X | X | X | X |
| 2 | 2nd | O | O | △ | O | O | X | X | O | O | X |
| 2 | 3rd | X | O | △ | O | O | O | X | X | O | X |
| L | 1st | O | X | X | O | O | X | X | X | X | O |
| L | 2nd | O | O | X | O | O | X | X | O | O | X |

AUTOMOTIVE CONTROL APPARATUS INCLUDING MEANS FOR PREVENTING INTERFERENCE BETWEEN RUNNING STABILITY CONTROL DEVICE AND TRANSMISSION SHIFT CONTROL DEVICE

CROSS REFERENCE TO RELATED APPLICATIONS

U.S. patent application Ser. No. 08/897,711 filed Jul. 18, 1997.

This application is based on Japanese Patent Application No. 8-264824 filed Oct. 4, 1996, the content of which is incorporated hereinto by reference.

BACKGROUND OF THE INVENTION

1. Field of the Invention

The present invention relates in general to an apparatus for controlling an automotive vehicle, more specifically, an engine, an automatic transmission and other devices of the vehicle. More particularly, the present invention is concerned with means for preventing an interference between running stability control means and controls of various devices in power transmitting system of the vehicle.

2. Discussion of the Related Art

An automotive vehicle may fall in an unstable running condition, in particular, an unstable turning condition, with the lateral road gripping capacity of a wheel tire being exceeded during turning of the vehicle on a road surface having a relatively low friction coefficient, or at a relatively high speed, or to clear an obstacle, for example. The unstable running condition may be an oversteering or understeering tendency of the vehicle. The oversteering tendency is caused when the road gripping force of the rear wheels is considerably smaller than that of the front wheels, resulting in an excessively larger turning angle of the vehicle than the steering angle, and leading to a spinning tendency of the vehicle. On the other hand, the understeering tendency is caused when the road gripping force of the front wheels is considerably smaller than that of the rear wheels, resulting in a considerably smaller turning angle of the vehicle than the steering angle.

To cope with such running instability of the vehicle, there has been proposed a turning stability control apparatus for stabilizing the vehicle turning behavior, such as a vehicle stability control system (VSC system) as disclosed in JP-A-4-266538. Such a turning stability control apparatus is activated when the vehicle turning condition is unstable, namely, when an oversteering or understeering tendency of the vehicle is detected. Described in detail, the apparatus is adapted to reduce the engine output and at the same time apply a braking force to an appropriate one or ones of the front and rear wheels, for producing a moment that reduces the oversteering or understeering tendency of the vehicle, thereby to stabilize the turning behavior of the vehicle.

In the automotive vehicle equipped with such a turning stability control apparatus, there are encountered various sorts of drawbacks due to interferences or inadequate coordination between an operation of the turning stability control apparatus, and an operation of a shift control device for shifting an automatic transmission of the vehicle.

For instance, such drawbacks may arise when a shift-down action of the automatic transmission takes place while the vehicle drive force is reduced by reducing the opening angle of a throttle valve or while at least one of the vehicle wheels is braked by a braking system, for improving the turning stability of the vehicle. The turning stability control apparatus may be operated during running of the vehicle on a road surface having a low friction coefficient, for example. In this case, the drive wheels of the vehicle may slip on the road surface having a low friction coefficient, due to an engine braking effect provided by the shift-down action of the automatic transmission. As a result, the turning stability control by reduction of the vehicle drive force or brake application may be deteriorated due to the slipping of the drive wheels caused by the shift-down action of the automatic transmission.

SUMMARY OF THE INVENTION

It is therefore an object of the present invention to provide an apparatus for controlling an automotive vehicle, which apparatus ameliorates the conventionally encountered drawbacks due to an interference or inadequate coordination between the operation of the running stability control apparatus, and the control operation for shifting the automatic transmission.

The above object may be achieved according to a first aspect of this invention, which provides an apparatus for controlling an automotive vehicle having an engine and an automatic transmission having a plurality of hydraulically operated frictional coupling devices, the apparatus comprising: running stability control means operated upon reduction of stability of running of the vehicle below a predetermined threshold, for controlling at least one of an output of the engine and a braking force applied to the vehicle, so as to improve the stability of running of the vehicle; shift control means for automatically shifting the automatic transmission by engagement of at least one of the plurality of frictional coupling device, depending upon a detected running condition of the vehicle; running stability control detecting means for detecting an operation of the running stability control means; and coupling pressure control means for controlling a hydraulic pressure to be applied to a selected one of the plurality of hydraulically operated frictional coupling devices, which is engaged to shift the automatic transmission under the control of the shift control means, such that a rate of rise of the hydraulic pressure is lower when the operation of the running stability control means is detected by the running stability control detecting means, than when the operation of the running stability control means is not detected.

In the vehicle control apparatus constructed according to the first aspect of the present invention, the hydraulic pressure of the frictional coupling device which is engaged to achieve a shifting action of the automatic transmission under the control of the shift control means is controlled by the coupling pressure control means, so that the hydraulic pressure is increased at a lower rate for comparatively slow engagement of the frictional coupling device, when the operation of the turning stability control means is detected by the turning stability control detecting means, than when the operation of the turning stability control means is not detected. Accordingly, the rate at which the vehicle drive force changes due to the shifting action of the automatic transmission is significantly lowered while the vehicle stability control means is in operation to reduce the engine output and/or apply a brake to the vehicle for improving the running stability of the vehicle. The present arrangement is effective to prevent otherwise possible deterioration of the running stability control by the running stability control means during the shifting action of the automatic transmission. Thus, the present vehicle control apparatus is adapted to prevent an interference between the running stability control by the turning stability control means and the control of the shifting action of the transmission by the shift control means.

Further, the present vehicle control apparatus is advantageous in that there does not arise any phenomenon which is unexpected to the vehicle operator upon termination of the running stability control and which would be encountered with a conventional vehicle control apparatus adapted to inhibit a shifting action of the automatic transmission during the operation of the running stability control operation. In the conventional vehicle control apparatus, the shifting action of the automatic transmission is initiated immediately after the termination of the running stability control operation. This delayed initiation of the shifting action is unexpected to the vehicle operator.

The object indicated above may also be achieved according to a second aspect of this invention, which provides an apparatus for controlling an automotive vehicle having an engine and an automatic transmission, the apparatus comprising: running stability control means operated upon reduction of stability of running of the vehicle below a predetermined threshold, for controlling at least one of an output of the engine and a braking force applied to the vehicle, so as to improve the stability of running of the vehicle; shift control means for automatically shifting the automatic transmission, depending upon a detected running condition of the vehicle as compared with a predetermined shift boundary pattern which determines a shift point at which the automatic transmission is shifted from a currently established position to another; running stability control detecting means for detecting an operation of the running stability control means; and shift point changing means for changing the shift point when the operation of the running stability control means is detected by the running stability control detecting means.

In the present vehicle control apparatus constructed according to the second aspect of this invention, the shift point at which the automatic transmission is shifted from the currently established position to another is lowered by the shift point changing means when the operation of the turning stability control means is detected by the turning stability control detecting means, as compared with the shift point used when the operation of the running is not detected. Consequently, the frequency of the shifting actions of the automatic transmission during the operation of the running stability control means is lowered. In other words, the shifting actions are less likely to take place while the engine output is reduced and/or the vehicle is braked, to improve the running stability of the vehicle, under the control of the running stability control means. Even if the shifting action takes place during operation of the running stability control means, this shifting down action does not have a significant influence on the drive torques or braking forces acting on the vehicle wheels, and does not have an adverse influence on the running stability of the vehicle. Further, the present arrangement is free from a phenomenon which is unexpected to the vehicle operator upon termination of the running stability control and which would be encountered with the conventional vehicle control apparatus which is adapted to inhibit a shifting action of the automatic transmission during the running stability control operation.

In one preferred form of the apparatus according to the above second aspect of the invention, the shift control means is adapted to determine whether the automatic transmission should be shifted down from the currently established position to another, on the basis of at least a detected running speed of the vehicle and according to a selected one of a first shift-down boundary line and a second shift-down boundary line which respectively determine a first and a second shift-down boundary point of the running speed of the vehicle. The first shift-down boundary point is lower than the second shift-down boundary point. In this form of the invention, the shift point changing means is adapted to select the first shift-down boundary point when the operation of the running stability control means is detected by the running stability control detecting means.

In the above preferred form of the apparatus wherein the shift point changing means is arranged to lower the shift-down boundary vehicle speed when the running stability control means is in operation, a shift-down action if achieved during operation of the running stability control means would not have a considerably adverse effect on the running stability of the vehicle, because the vehicle speed at which the shift-down action is achieved when the running stability control means is in operation is lower than when the running stability control means is not in operation.

BRIEF DESCRIPTION OF THE DRAWINGS

The above and optional objects, features, advantages and technical and industrial significance of the invention will be better understood by reading the following detailed description of presently preferred embodiments of the invention, when considered in connection with the accompanying drawings, in which:

FIG. 2 is a view indicating a relationship between combinations of operating states of frictional coupling devices of the automatic transmission and respective operating positions of the automatic transmission;

DETAILED DESCRIPTION OF THE PREFERRED EMBODIMENTS

Figure 1:
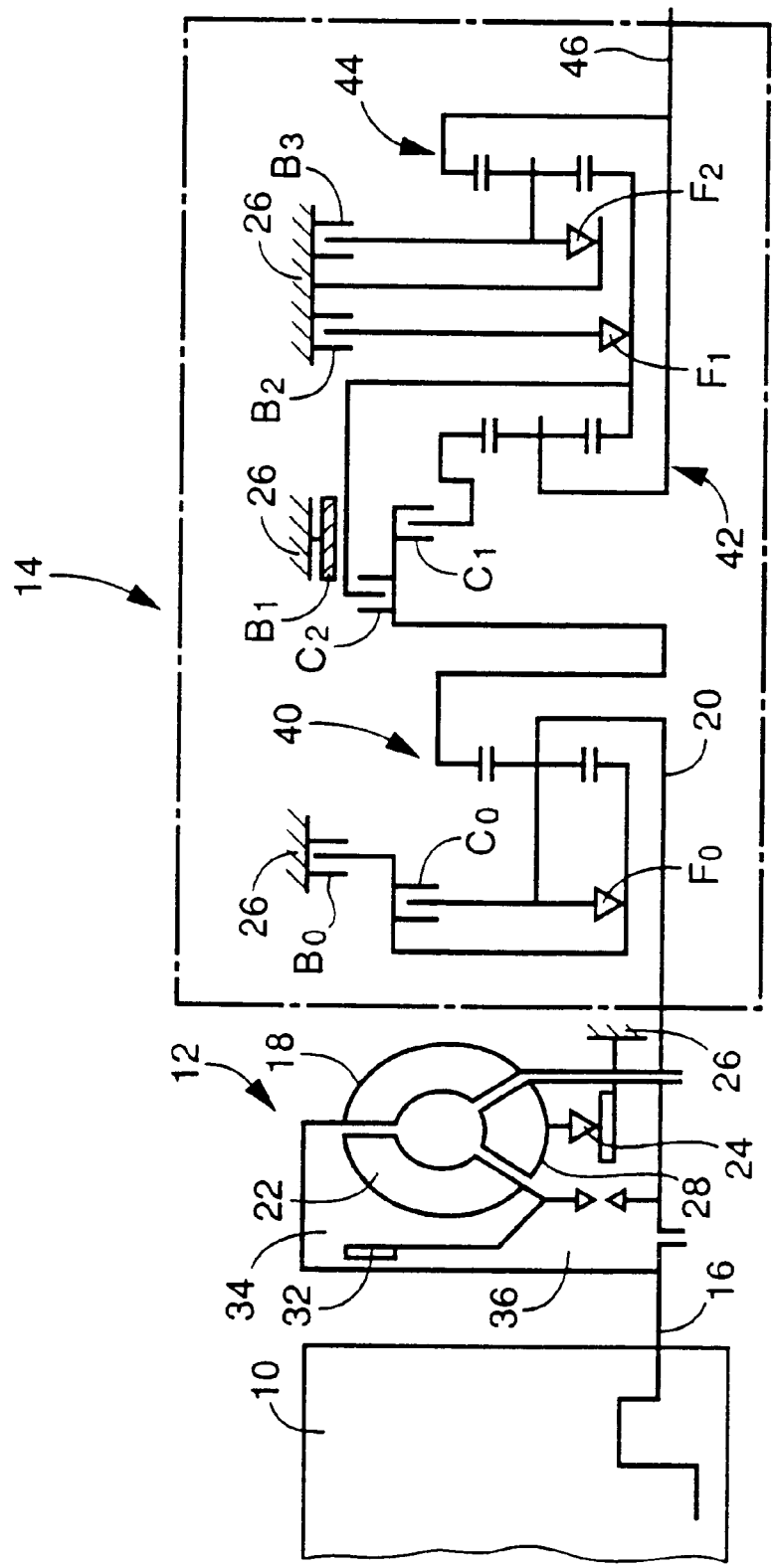
FIG. 1 is a schematic view of a power transmitting system of an automotive vehicle including an engine and an automatic transmission respectively controlled by an engine controller and a transmission controller, which constitute a vehicle control apparatus constructed according to one embodiment of this invention.

Referring first to the schematic view of FIG. 1, the power transmitting system shown therein includes a fluid-operated power transmitting device in the form of a torque converter 12 connected to an engine 10, and an automatic transmission 14 connected to the torque converter 12. An output of the engine 10 is transmitted to drive wheels of the automotive vehicle through the torque converter 12, automatic transmission 14 and a differential gear device known in the art. The torque converter 12 includes a pump impeller 18 connected to a crankshaft 16 of the engine 10, a turbine impeller 22 connected to an input shaft 20 of the automatic transmission 14, a stator impeller 28 connected through a one-way clutch 24 to a stationary member in the form of a housing 26, and a lock-up clutch 32 connected through a damper to the input shaft 20. The lock-up clutch 32 is placed in a fully released position when the pressure in a releasing oil chamber 36 of the torque converter 12 is higher than that in an engaging oil chamber 34 of the torque converter 12, and in a fully engaged position when the pressure in the engaging oil chamber 34 is higher than that in the releasing oil chamber 36. With the lock-up clutch 32 placed in the fully released position, the torque received by the torque converter 12 is amplified at a ratio corresponding to a ratio of the input speed of the torque converter 12 to the output speed, and the thus amplified torque is transmitted to the automatic transmission 14 through the input shaft 20. With the lock-up clutch 32 placed in the fully engaged position, the output of the engine 10 received by the lock-up clutch 32 through the crankshaft 16 is directly transmitted to the automatic transmission 14 through the input shaft 20.

The automatic transmission 14 includes first, second and third planetary gear sets 40, 42, 44 of single pinion type which are disposed coaxially with each other. The automatic transmission 14 further includes an output shaft 46 connected to a carrier of the second planetary gear set 42 and a ring gear of the third planetary gear set 44. Some rotary elements of the three planetary gear sets 40, 42, 44 are integrally connected to each other, and the other rotary elements are selectively connected to each other through three clutches C0, C1, C2 or selectively fixed to the housing 26 through four brakes B0, B1, B2 and B3. Three one-way clutches F0, F1 and F2 are provided for selective connection of the above-indicated other rotary elements to each other through the clutches C0, C1, C2 or for selective fixing thereof to the housing 26 through the brakes B0–B3, depending upon the direction of rotation of the input member of each one-way clutch.

Since the torque converter 12 and the automatic transmission 14 are symmetrical with respect to their axes, only the upper halves of the torque converter and automatic transmission are shown in FIG. 1.

Figure 3:
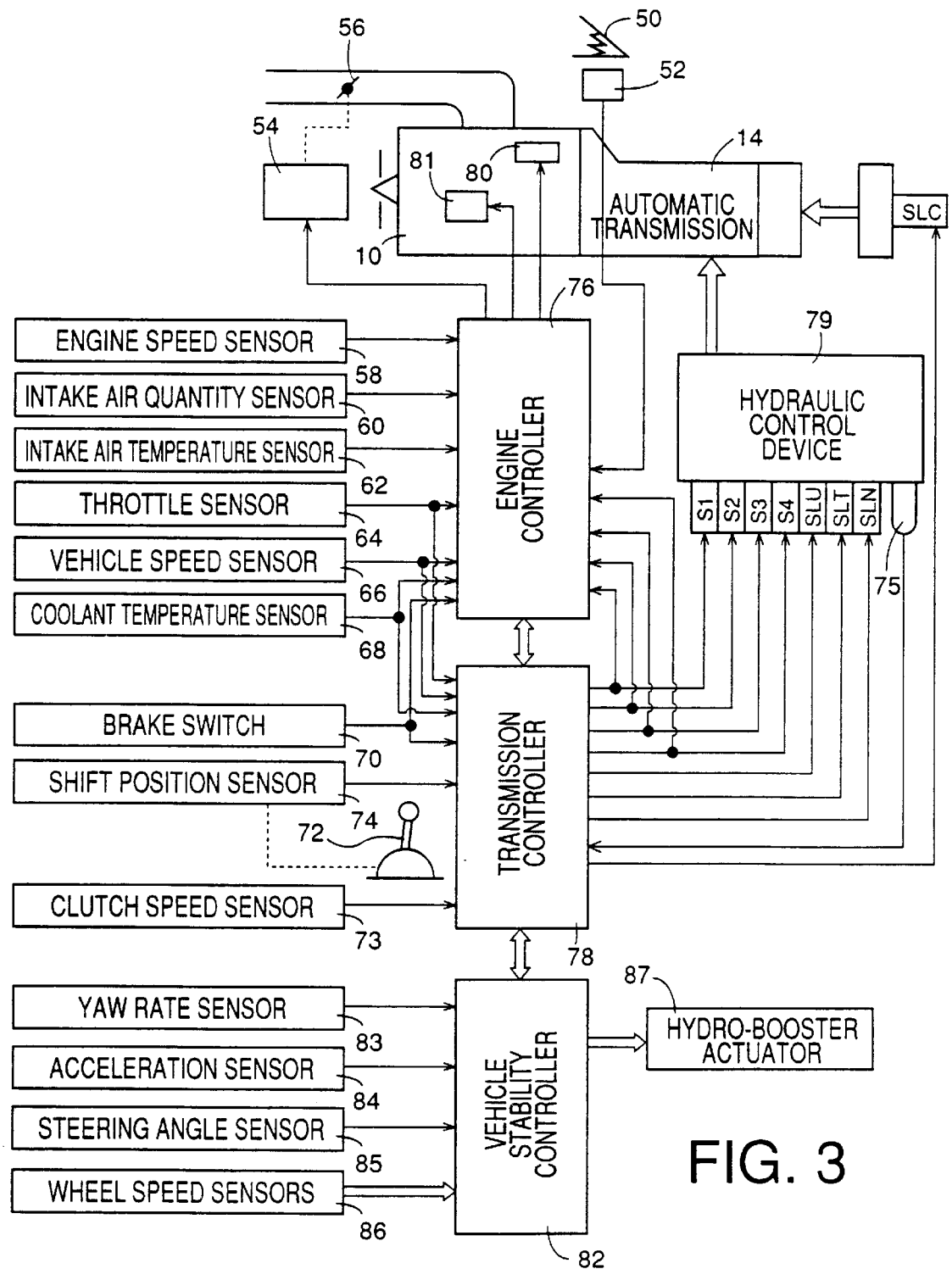
FIG. 3 is a block diagram illustrating an electrical system and a hydraulic control system of the vehicle control apparatus.

The clutches C0, C1, C2 and brakes B0–B3 (generally referred to as clutches C and brakes B) are frictional coupling devices such as multiple-disk clutches or band brakes, which are actuated (engaged and released) by suitable hydraulic actuators operated by a pressurized working fluid supplied from a hydraulic control device 79 (FIG. 3). The hydraulic control device 79 is provided with a large number of switch valves including solenoid-operated valves S1, S2 whose solenoids are selectively energized or deenergized according to control signals received from an electronic transmission controller 78 (FIG. 3), so that the clutches C and brakes B are selectively engaged to establish a selected one of four forward-drive positions "1st", "2nd", "3rd" and "O/D" of the automatic transmission 14, as indicated in the table FIG. 2. The hydraulic control device 79 further includes a linear solenoid valve SLU whose solenoid is energized or deenergized according to a control signal from the transmission controller 78, so that the lock-up clutch 32 is fully engaged or fully released, or placed in a partially engaged state.

The automotive vehicle has a shift lever 72 disposed adjacent to a driver's seat. The shift lever 72 has three forward-drive positions, i.e., DRIVE position "D", SECOND position "2" and LOW position "L". With the shift lever 72 placed in the DRIVE position "D", the automatic transmission 14 can be shifted to any one of the four drive positions, namely, first-speed position "1st", second-speed position "2nd", third-speed position "3rd" and overdrive position "O/D". With the shift lever 72 placed in the SECOND position "2", the automatic transmission 14 can be shifted to any one of the three forward drive positions "1st", "2nd" and "3rd". With the shift lever 72 placed in the LOW position "L", only the first-speed position "1st" and the second-speed position "2nd" are available.

The shift lever 72 is mechanically linked with a manual shift valve so that the brake B1 or B3 is engaged to apply an engine brake to the vehicle when the automatic transmission 14 is shifted to the second-speed position "2nd" with the shift lever 72 placed in the SECOND position "2" or LOW position "L", or to the first-speed position "1st" with the shift lever 72 placed in the LOW position "L".

In the table of FIG. 2, "o" represents the energized state of the solenoids of the solenoid-operated S1, S2 or the engaged state of the clutches and brakes C, B, while "x" represents the deenergized state of the solenoids or the released state of the clutches and brakes C, B. Further, "Δ" represents the partially engaged state of the linear solenoid SLU for controlling the amount of slip of the lock-up clutch 32.

As shown in FIG. 3, the vehicle control apparatus includes: an electronic engine controller 76 for controlling the engine 10; the above-indicated electronic transmission controller 78 for controlling the lock-up clutch 32 and the automatic transmission 14 as described above, and an electronic vehicle stability controller 82 for controlling a hydrobooster actuator 87 which will be described. The vehicle control apparatus uses various sensors including: an accelerator sensor 52 for detecting an amount of operation of an accelerator pedal 50, which amount is used to operate a throttle actuator 54 for controlling a throttle valve 56 disposed in an intake pipe of the engine 10; an engine speed sensor 58 for detecting a speed $N_E$ of the engine 10; an intake air quantity sensor 60 for detecting an intake air quantity Q/N of the engine 10; an intake air temperature sensor 62 for detecting a temperature $T_A$ of an intake air of the engine 10; a throttle sensor 64 for detecting an opening angle $\theta_{TH}$ of the throttle valve 56; a vehicle speed sensor 66 for detecting a speed $N_{OUT}$ of the output shaft 46 of the automatic transmission 14, which is used to obtain a running speed V of the vehicle; a coolant temperature sensor 68 for detecting a temperature $T_W$ of a coolant water of the engine 10; a BRAKE switch 70 for detecting an operating state BK of a braking system of the vehicle; a clutch speed sensor 73 for detecting a speed $N_{CO}$ of the clutch C0 of the automatic transmission 14 (which is equal to the speed of the input shaft 20); a shift position sensor 74 for detecting a currently established position $P_{SH}$ of the shift lever 72; and an oil temperature sensor 75 for detecting a temperature $T_{OIL}$ of the working oil used for the hydraulic control device 79.

The engine and transmission controllers 76, 78 receive the output signals of the above-indicated various sensors, which represent the engine speed $N_E$, intake air quantity Q/N, intake air temperature $T_A$, throttle valve opening angle $\theta_{TH}$, output shaft speed $N_{OUT}$ (vehicle speed V), engine coolant temperature $T_W$, brake operating state BK, clutch speed $N_{CO}$ (input shaft speed), shift lever position $P_{SH}$, and working oil temperature $T_{OIL}$.

The engine controller 76 is constituted by a so-called microcomputer incorporating a central processing unit (CPU), a random-access memory (RAM), a read-only memory (ROM), and an input and output interface. The CPU operates to process the various input signals, according to control programs stored in the ROM while utilizing a temporary data storage function of the RAM. The engine controller 76 controls: a fuel injector valve 80 for controlling the amount of injection of a fuel into the engine 10; an ignitor 81 for controlling an ignition timing of the engine 10; a suitable by-pass valve for controlling the idling speed of the engine 10; and the throttle valve 56 through the throttle actuator 54, for effecting traction control well known in the art, that is, for controlling the drive forces applied to the vehicle drive wheels. The engine controller 76 is connected to the transmission controller 78, and to the electronic vehicle stability controller 82, so that each of these controllers 76, 78, 82 may receive the necessary signals from the other controllers.

Figure 5:
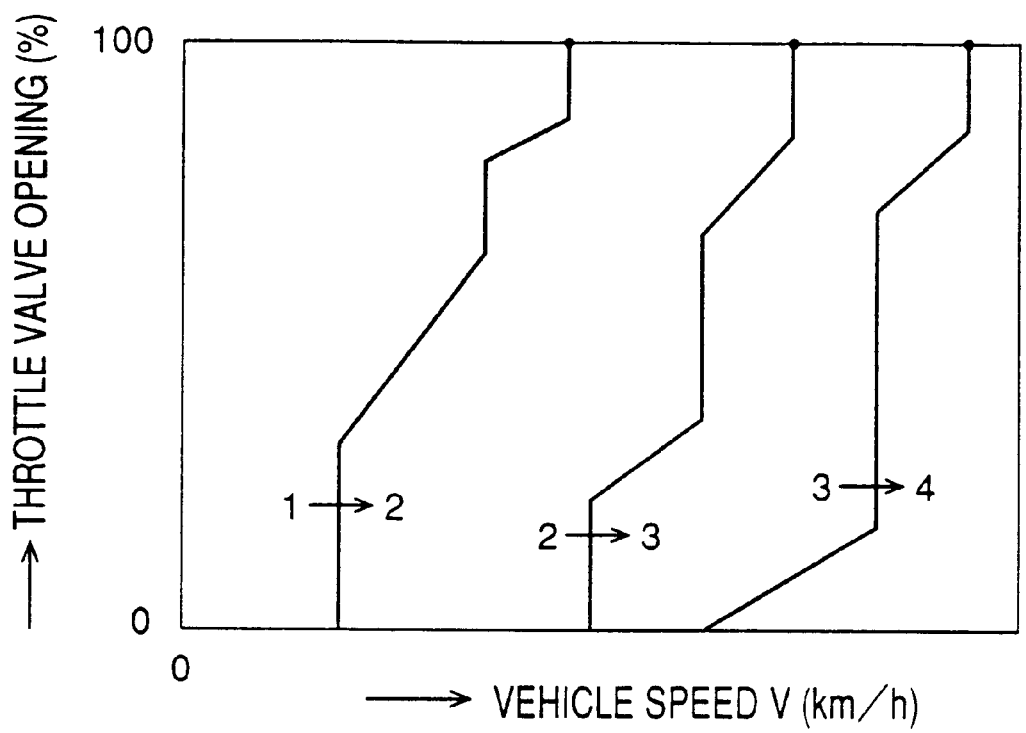
FIG. 5 is a view indicating examples of shift boundary lines used by the transmission controller.

The transmission controller 78 is also constituted by a so-called microcomputer similar to that of the engine controller 76. The CPU of the transmission controller 78 operates to process the input signals according to control programs stored in the ROM while utilizing a temporary data storage function of the RAM, for controlling the solenoid-operated valves S1, S2 and linear solenoid valve SLU described above, and linear solenoid valves SLT and SLN. The transmission controller 78 controls the linear solenoid valve SLT so as to generate a THROTTLE pressure $p_{TH}$ corresponding to the opening angle $\theta_{TH}$ of the throttle valve 52, and controls the linear solenoid valve SLN so as to control an accumulator back pressure. As indicated above, the transmission controller 78 controls the linear solenoid valve SLU for fully engaging or releasing the lock-up clutch 32 or controlling the amount of slip of the lock-up clutch 32. Further, the transmission controller 78 is adapted to determine whether the automatic transmission 14 should be shifted from the currently established position to another position. This determination is effected on the basis of the detected throttle opening angle $\theta_{TH}$ (%) and vehicle speed V, and according to predetermined shift boundary patterns. The shift boundary patterns may be shift boundary lines as indicated in FIG. 5 by way of example. The shift boundary lines are represented by data maps stored in the ROM of the transmission controller 78. To shift up or shift down the automatic transmission 14, the transmission controller 78 controls the solenoid-operated valves S1, S2 as indicated in FIG. 2.

As shown in FIG. 3, the vehicle stability controller 82 is adapted to receive the output signals of a yaw rate sensor 83, an acceleration sensor 84, a steering angle sensor 85 and four wheel speed sensors 86. The output signal of the yaw rate sensor 83 represents a yaw rate $\omega_Y$ of the vehicle body, i.e., an angular velocity about the vertical axis. The output signal of the acceleration sensor 84 represents an acceleration value G of the vehicle body in the longitudinal direction. The output signal of the steering angle sensor 85 represents a steering angle $\theta_W$, i.e., an angle of rotation of a steering wheel of the vehicle. The output signals of the wheel speed sensors 86 represent rotating speeds $N_{W1}$–$N_{W4}$ of the four wheels of the vehicle, respectively. The vehicle stability controller 82 is also constituted by a microcomputer similar to those of the controllers 76, 78. The CPU of the vehicle stability controller 82 operates to process the input signals according to control programs stored in the ROM while utilizing a temporary data storage function of the RAM, for controlling the throttle valve 56 through the throttle actuator 54, and for controlling suitable solenoid-operated brake control valves provided in the hydro-booster actuator 87, to apply a brake to an appropriate one or one of the four wheels. The hydro-booster actuator 87, which is incorporated in the hydraulic braking system, is capable of controlling the braking forces acting on the individual wheels as needed, independently of each other. As indicated above, the vehicle stability controller 82 is connected to the engine and transmission controllers 76, 78, for receiving the necessary signals from the controllers 76, 78.

Figure 4:
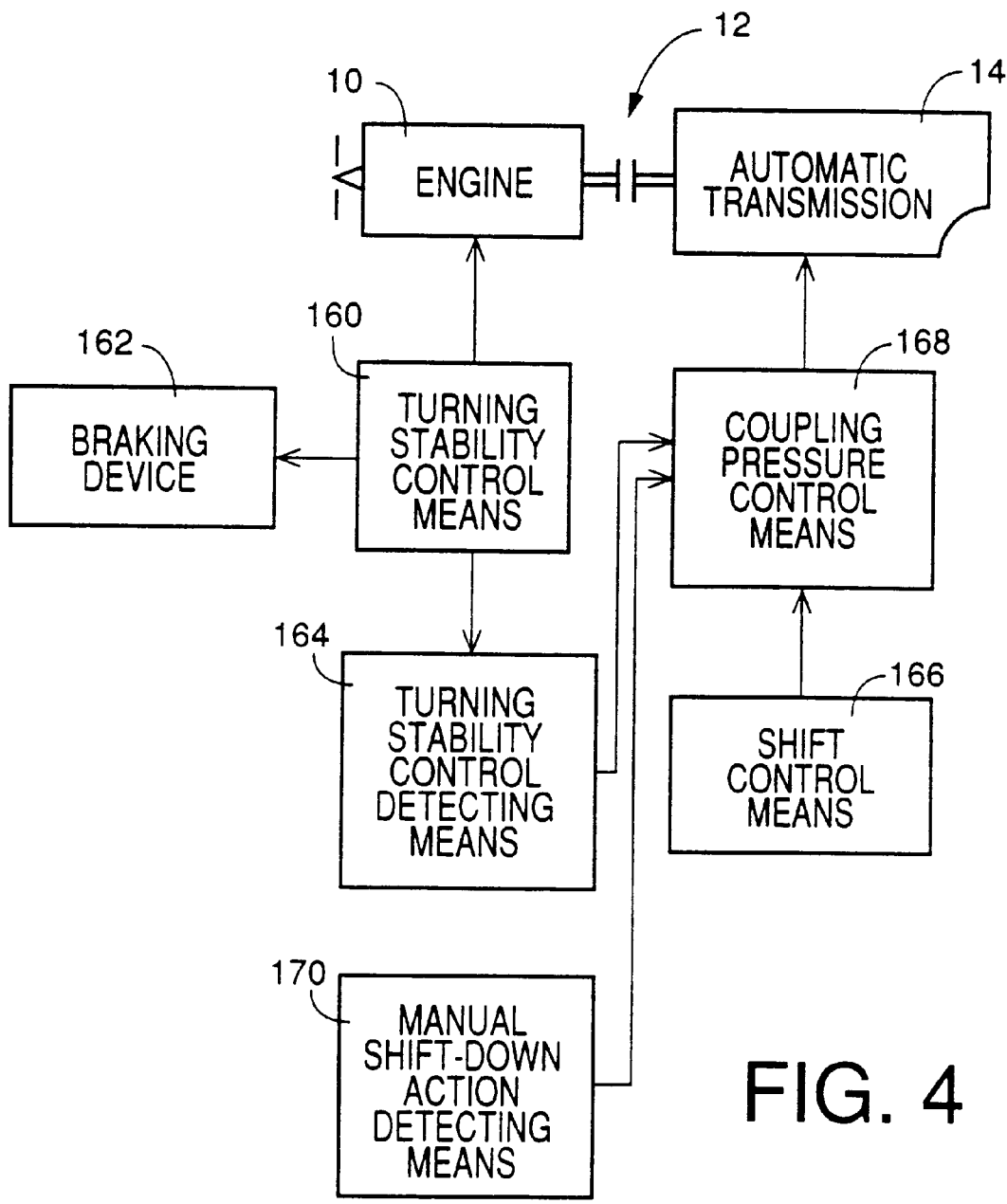
FIG. 4 is a block diagram illustrating various functional means of the vehicle control apparatus according to the first embodiment of the invention.

Referring to the block diagram of FIG. 4, there are shown functional means of the vehicle control apparatus including the engine and transmission controllers 76, 78 and vehicle stability controller 82. The vehicle control apparatus includes running stability control means in the form of turning stability control means 160, a braking device 162, running stability control detecting means in the form of turning stability control detecting means 164, shift control means 166, coupling pressure control means 168, and manual shift-down action detecting means 170. The braking device 162 includes the hydro-booster actuator 87, which is capable of controlling the braking forces acting on the wheels of the vehicle as described above.

The turning stability control means 160 is operated upon reduction of turning stability of the vehicle below a predetermined threshold, for activating the braking device 162 (including the hydro-booster actuator 87) to apply a brake to an appropriate one or ones of the wheels (apply a controlled braking pressure to the appropriate wheel brake cylinder), or alternatively controlling the throttle actuator 54 to reduce the opening angle $\theta_{TH}$ of the throttle valve 56 for thereby reducing the output of the engine 10, so that the lateral slip of the wheels is reduced for increasing the stability of turning of the vehicle.

In the present embodiment, the turning stability control means 160 is adapted to determine that the vehicle is suffering from an oversteering tendency, if a slip angle $\beta$ between the longitudinal direction of the vehicle and the direction of movement of the gravity center of the vehicle is larger than a predetermined upper limit, while at the same time a rate of change $d\beta/dt$ of the slip angle $\beta$ is higher than a predetermined upper limit. In this case, the turning stability control means 160 commands the braking device 162 to brake one of the front wheels which is on the outer side of the turning path of the vehicle, in order to generate a moment for reducing the oversteering tendency and thereby improving the turning stability of the vehicle while at the same time lowering the vehicle speed V to increase the running stability. The turning stability control means 160 is further adapted to determine that the vehicle is suffering from an understeering tendency, if the detected yaw rate $\omega_Y$ of the vehicle is lower than a threshold determined by the steering angle $\theta_W$ and vehicle speed V. In this instance, the turning stability control means 160 commands the throttle actuator 54 to reduce the throttle opening angle $\theta_{TH}$ for reducing the engine output, and controls the braking device 162 to brake an appropriate one of the rear wheels, in order to generate a moment for reducing the understeering tendency and thereby improving the vehicle turning stability.

The turning stability control detecting means 164 is adapted to detect an operation of the turning stability control means 160, on the basis of the outputs of the vehicle stability controller 82, for example.

The shift control means 166 is adapted to select one of the operating positions of the automatic transmission 14, on the basis of the detected running condition of the vehicle and according to the predetermined shift boundary lines. For example, the running condition is represented by the detected throttle opening angle $\theta_{TH}$ and vehicle speed V, and the shift boundary lines are relationships between the throttle opening angle $\theta_{TH}$ and the vehicle speed V, which are expressed in a two-dimensional coordinate system, as indicated in FIG. 5, by way of example. When the vehicle is running with the automatic transmission 14 placed in the first-speed position "1", for instance, the shift control means 166 uses a 1-2 shift-up boundary line, and determines whether a point defined by the detected throttle opening angle $\theta_{TH}$ and vehicle speed V is moved across the 1-2 shift-up boundary line from the left side of the line into the right side. If an affirmative decision is obtained in the above determination, the shift control means 166 energizes the solenoid-operated valve S2 as well as the solenoid-operated valve S1, to establish the second-speed position "2nd", that is, to shift up the automatic transmission 14 from the first-speed position "1st" to the second-speed position "2nd". Thus, the shift control means 166 is adapted to automatically shift the automatic transmission 14 from the currently established position to another, depending upon the detected running condition of the vehicle as represented by the throttle opening angle $\theta_{TH}$ and vehicle speed V, as compared with the predetermined shift boundary pattern which is represented by the shift boundary line corresponding to the currently established position. The shift boundary pattern in the form of the shift boundary line determines a shift point at which the automatic transmission 14 is shifted from the currently established position to another.

When the shift lever 72 is placed in the SECOND position "2", the automatic transmission 14 cannot be shifted to the overdrive position "O/D", as is apparent from the table of FIG. 2. When the shift lever 72 is placed in the LOW position "L", the automatic transmission 14 cannot be shifted to the third-speed and overdrive positions "3rd", "O/D", as is also apparent from FIG. 2.

While only the shift-up boundary lines are illustrated in FIG. 5 by way of example, the shift control means 166 uses shift-down boundary lines whose patterns are different from the shift-up boundary lines.

The coupling pressure control means 168 is adapted to control the linear solenoid valve SLN for controlling the back pressure of the accumulator, which determines the rate of change of the hydraulic pressure applied to the frictional coupling devices B, C. Described more specifically, when the shift control means 166 determines that the automatic transmission 14 should be shifted from the presently established position to another, the shift control means 166 commands the coupling pressure control means 166 to regulate the back pressure of the above-indicated accumulator, so that the pressure of the frictional coupling device B, C that should be engaged to shift up or down the automatic transmission 14 is increased at a predetermined rate, or so that the engine speed $N_E$ rises at a predetermined rate during the engaging action of the frictional coupling device in question. Thus, the coupling pressure control means 168 controls the rate of increase of the hydraulic pressure applied to engage the appropriate frictional coupling device for establishing the newly selected position of the automatic transmission 14.

The coupling pressure control means 168 is operated to control the rate of increase of the hydraulic pressure of the appropriate frictional coupling device, in a different manner, when any manual shift-down action of the automatic transmission 14 is detected by the manual shift-down action detecting means 170.

The manual shift-down action of the automatic transmission 14 is a shift-down action which takes place as a result of an operator's manipulation of the vehicle. For example, the following manual shift-down actions of the automatic transmission 14 are detected by the manual shift-down action detecting means 170:

a) a 4-3 shift-down action from the overdrive position "O/D" to the third-speed position "3rd" when an OVERDRIVE OFF switch (not shown) is turned on to inhibit the selection of the overdrive position "O/D";

b) a 3-2 shift-down action from the third-speed position "3rd" to the second-speed position "2nd" as a result of an operation of the shift lever 72 from the DRIVE position "D" to the SECOND position "2";

c) a 2-1 shift-down action from the second-speed position "2nd" to the first-speed position "1st" as a result of an operation of the shift lever 72 from the SECOND position "2" to the LOW position "L"; and d) a shift-down action as a result of an abrupt depression of the accelerator pedal 50.

The 4-3 shift-down action, the 3-2 shift-down action and the 2-1 shift-down action which are indicated above at a), b) and c) are achieved by engaging the clutch C0, brake B1 and brake B3, respectively, as is apparent from the table of FIG. 2.

When any one of the manual shift-down actions of the automatic transmission 14 is detected by the manual shift-down action detecting means 170, the coupling pressure control means 168 controls the linear solenoid valve SLN so that a rise of the the hydraulic pressure of the appropriate frictional coupling device (e.g., C0, B1, B3) to be engaged to achieve the manual shift-down action is suitably delayed as compared with a rise in the case of the normal shifting action (shifting actions other than the manual shift-down actions) of the automatic transmission 14. In other words, the hydraulic pressure of the appropriate frictional coupling device is made lower in the case of any manual shift-down action than in the case of the normal shifting action, during a certain period after the moment of generation of a shifting command from the shift control means 166 to the coupling pressure control means 168. The delayed rise or reduction of the hydraulic pressure under the control of the coupling pressure control means 168 is effective to prevent a sudden drop of the vehicle drive torque upon the manual shift-down action.

Referring to the flow chart of FIG. 6, there will be described a coupling pressure control routine executed by the transmission controller 78, to control the hydraulic pressure to be applied to a frictional coupling device which is engaged to achieve a shifting action of the automatic transmission, in two different manners depending upon whether or not the shifting action is a manual shift-down action during operation of the turning stability control means 160.

The coupling pressure control routine is initiated with step SA1 corresponding to the turning stability control detecting means 164, to determine whether the turning stability control means 160 is in operation under the control of the vehicle stability controller 82, that is, whether the throttle actuator 54 is operated to reduce the throttle opening angle $\theta_{TH}$ or the braking device 162 is operated to reduce the vehicle drive force. This determination is effected on the basis of the output signals of the vehicle stability controller 82.

If a negative decision (NO) is obtained in step SA1, the control flow goes to step SA2 in which the linear solenoid valve SLN is controlled in the normal manner, to regulate the hydraulic pressure to be applied to the frictional coupling device for achieving the shifting action of the automatic transmission 14 so that the hydraulic pressure of the frictional coupling device in question is increased at a predetermined rate or so that the engine speed $N_E$ rises at a predetermined rate.

Figure 7:
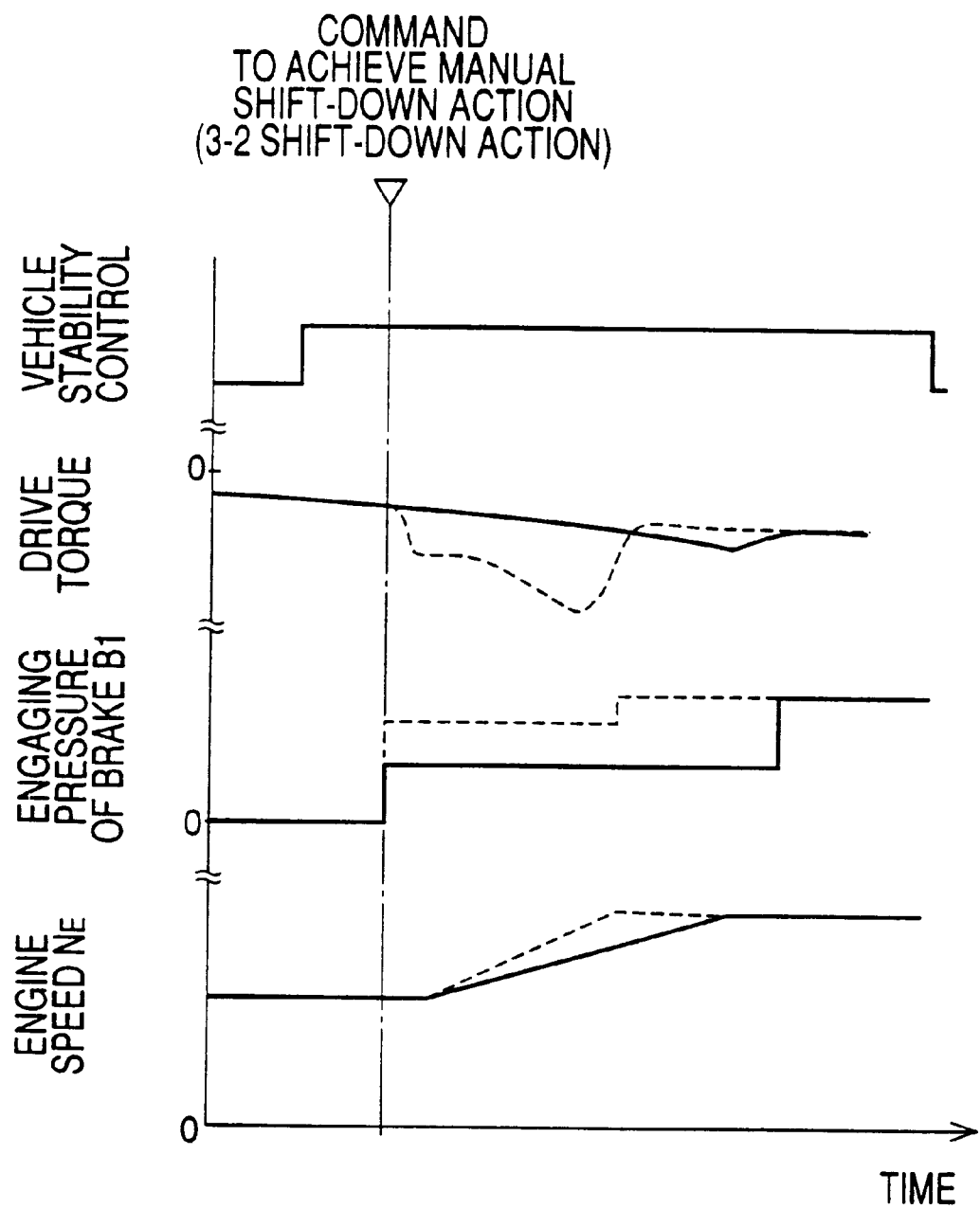
FIG. 7 is a time chart for explaining a change in hydraulic pressure of a frictional coupling device upon a manual shift-down action of the automatic transmission during turning stability control of the vehicle.

If an affirmative decision (YES) is obtained in step SA1, the control flow goes to step SA3 corresponding to the manual shift-down action detecting means 170, to determine whether the shift control means 166 has commanded the automatic transmission 14 to achieve any manual shift-down action, for instance, the 3-2 shift-down action in response to an operation of the shift lever 72 from the DRIVE position "D" to the SECOND position "2". If a negative decision (NO) is obtained in step SA3, as a result of detection of the manual 3-2 shift-down action, for example, the control flow goes to step SA2 described above. if an affirmative decision (YES) is obtained in step SA3, the control flow goes to step SA4 in which the linear solenoid valve SLN is controlled so that a rise of the hydraulic pressure to be applied to the brake B1 (frictional coupling device in question) s delayed, as indicated by solid line in FIG. 7, with respect to the rise in the case of the normal shifting action of the automatic transmission 14, as indicated by broken line in FIG. 7. Namely, the hydraulic pressure of the brake B1 is increased at a comparatively low rate, to achieve the manual 3-2 shift-down action while preventing a sudden drop of the vehicle drive torque as indicated in broken line in FIG. 7, that is, while assuring a smooth decrease of the vehicle drive force as indicated by solid line in FIG. 7.

It will be understood that steps SA2 and SA4 correspond to the coupling pressure control means 168. It is noted that the command to achieve the manual 3-2 shift-down action of the automatic transmission 14 is generated from the shift control means 166 while the throttle opening angle $\theta_{TH}$ is zero, in the specific example of FIG. 7.

In the vehicle control apparatus according to the present embodiment of the invention, the hydraulic pressure of the frictional coupling device (e.g., brake B1) which is engaged to achieve a manual shift-down action (e.g., manual 3-2 shift-down action) of the automatic transmission 14 according to a command generated by the shift control means 166 is controlled in step SA4 by the coupling pressure control means 168, so that the hydraulic pressure is increased at a lower rate for comparatively slow engagement of the frictional coupling device, when the operation of the turning stability control means 160 is detected in step SA1 by the turning stability control detecting means 164, than when the operation of the turning stability control means 160 is not detected. Accordingly, the rate at which the vehicle drive force decreases due to the manual shift-down action of the automatic transmission is significantly lowered while the vehicle stability control means 160 is in operation to activate the throttle actuator 54 or braking system 162 for improving the turning stability of the vehicle. The present arrangement is effective to prevent otherwise possible deterioration of the turning stability control by the turning stability control means 160 during the shift-down action of the automatic transmission 14. Thus, the present vehicle control apparatus is adapted to prevent an interference between the turning stability control by the turning stability control means 160 and the control of the shifting action of the transmission 14 by the shift control means 166.

The present vehicle control apparatus has another advantage that there does not arise any phenomenon which is unexpected to the vehicle operator upon termination of the turning stability control and which would be encountered with a conventional vehicle control apparatus adapted to inhibit a shift-down action of the automatic transmission 14 during the turning stability control operation. In this conventional vehicle control apparatus, the shift-down action of the automatic transmission is initiated immediately after the termination of the turning stability control operation. This delayed initiation of the shift-down action is unexpected to the vehicle operator.

When the vehicle operator operates the shift lever 72 from the DRIVE position "D" to the SECOND position "2" with the automatic transmission 14 placed in the third-speed position "3rd", for example, the vehicle operator usually expects that a relatively large and abrupt engine brake is applied to the vehicle as a result of the 3-2 shift-down action of the automatic transmission 14. While the turning stability control means 160 is not in operation, such an abrupt engine brake is applied to the vehicle as expected by the vehicle operator, since the hydraulic pressure of the frictional coupling device which is engaged to achieve the manual shift-down action is controlled in the normal manner. Namely, the rise of the hydraulic pressure of the frictional coupling device is delayed in step SA2 only when the turning stability control means 160 is in operation.

Figure 8:
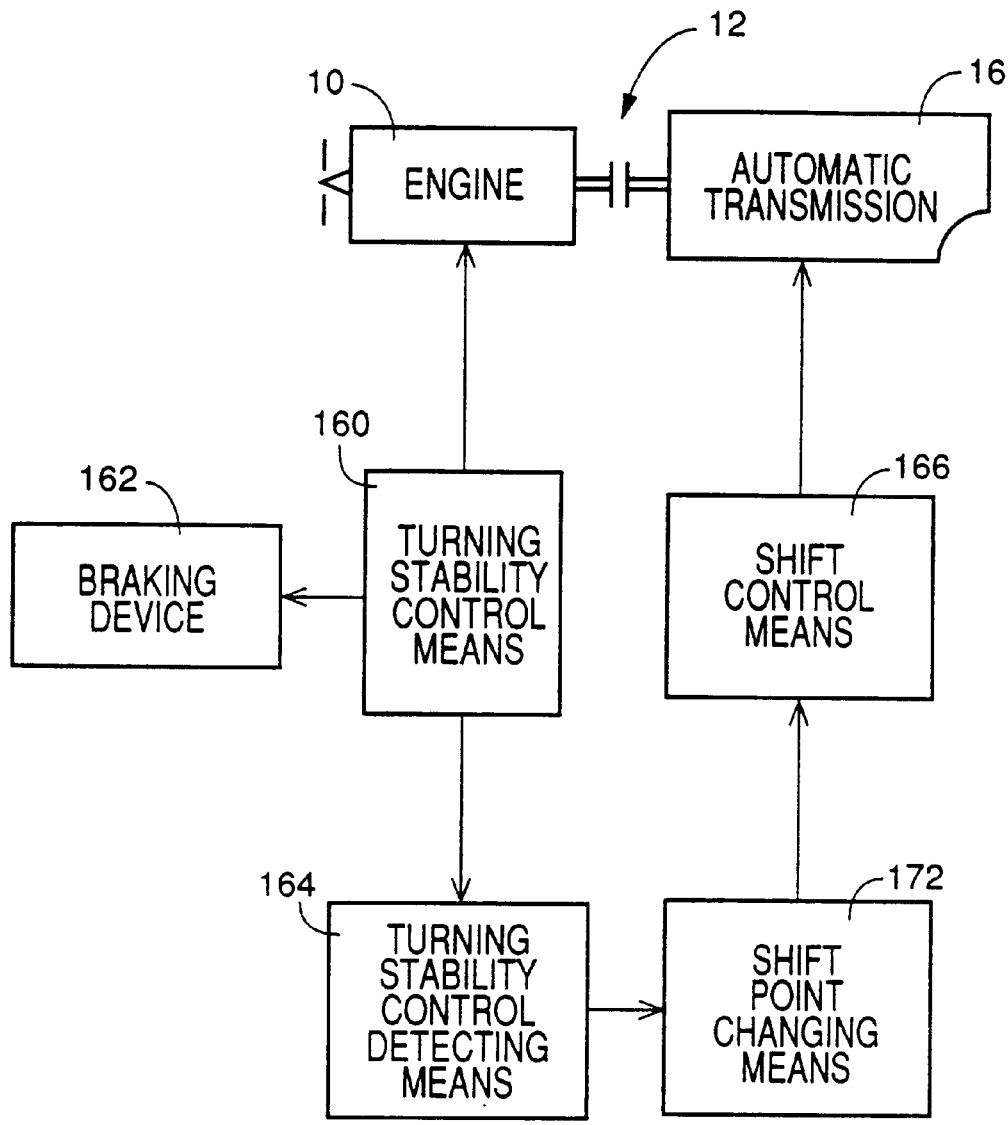
FIG. 8 is a block diagram corresponding to that of FIG. 4, illustrating various functional means of a vehicle control apparatus according to a second embodiment of this invention.
Figure 9:
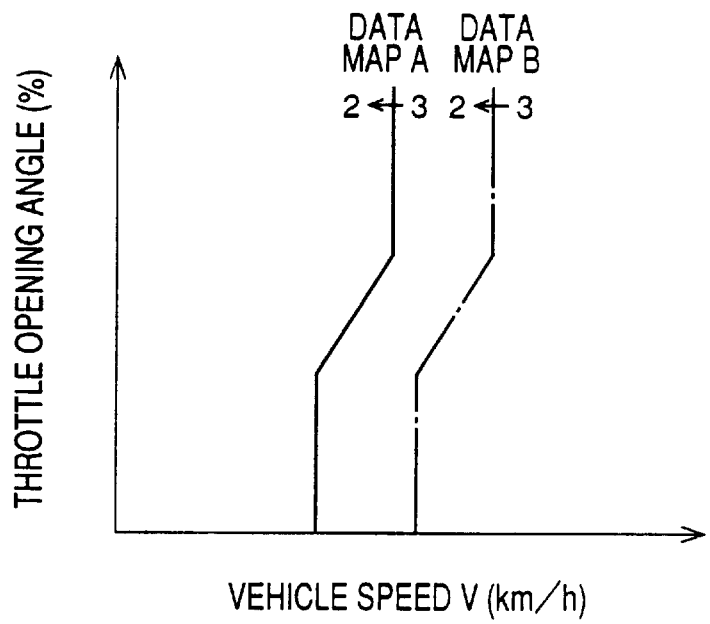
FIG. 9 is a view wherein solid line indicates a 3-2 shift-down boundary line used when turning stability control means of the vehicle control apparatus is in operation, while one-dot chain line indicates a 3-2 shift-down boundary line used when the turning stability control means is not in operation.
Figure 10:
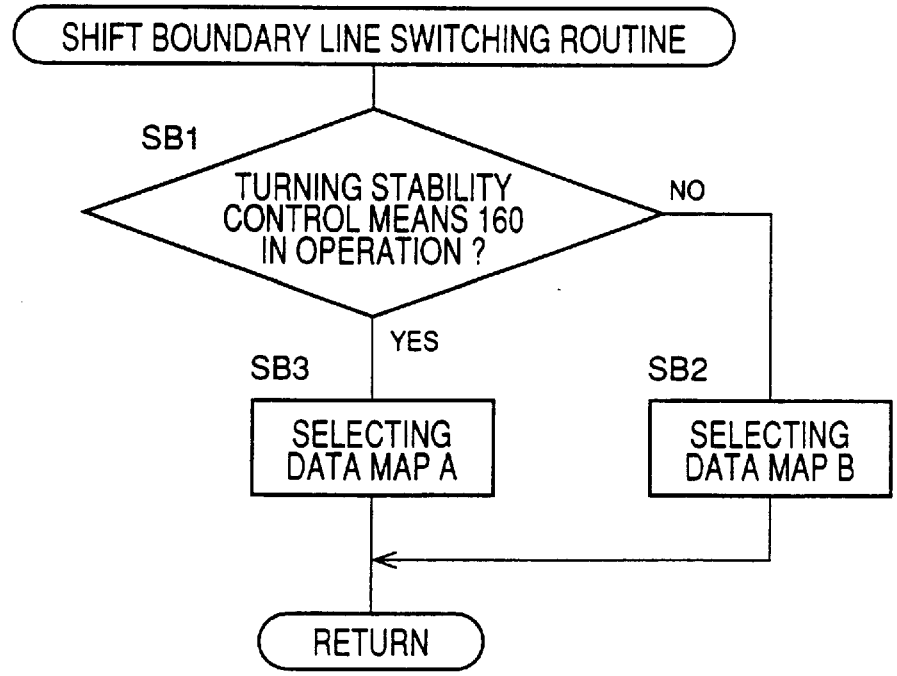
FIG. 10 is a flow chart corresponding to that of FIG. 6, illustrating an operation of the transmission controller of the vehicle control apparatus in the embodiment of FIG. 8.

Referring next to FIGS. 8–10, a second embodiment of this invention will be described. The same reference signs as used in the first embodiment will be used in this second embodiment to identify the functionally corresponding elements.

The vehicle control apparatus according to the present second embodiment includes the turning stability control means 160, braking system 162, turning stability control detecting means 164 and shift control means, which have been described above, and further includes shift point changing means 172 adapted to select one of shift boundary lines which is used by the shift control means 166, depending upon whether the turning stability control means 160 is in operation or not. For instance, the ROM of the transmission controller 78 stores data map A representative of a 3-2 shift-down boundary line indicated by solid line in FIG. 9, and data map B representative of a 3-2 shift-down boundary line indicated by one-dot chain line in FIG. 9. The shift control means 166 generates a command to achieve the 3-2 shift-down action of the automatic transmission 14, at a lower vehicle speed V according to the 3-2 shift-down boundary line represented by the data map A, than according to the 3-2 shift-down boundary line represented by the data map B, provided that the throttle opening angle $\theta_{TH}$ is held unchanged.

The shift point changing means 172 selects the data map A when the turning stability control means 160 is in operation, and selects the data map B when the turning stability control means 160 is not in operation. Thus, the shift boundary vehicle speed V at which the automatic transmission 14 is commanded to be shifted from the third-speed position "3rd" to the second-speed position "2nd" is lowered when the operation of the turning stability control means 160 is detected by the turning stability control detecting means 164.

The shift point changing means 172 may be adapted to select one of two shift boundary lines (one of two data maps) for each of the shift-down actions other than the 3-2 shift-down action of the automatic transmission 14, in the same manner as described above, so that the shift-down boundary vehicle speed V is lowered when the turning stability control means 160 is in operation. In this respect, it is noted that the frequency of operation of the turning stability control means 160 is lower at the relatively low vehicle speed V than at the relatively high vehicle speed V.

Referring to the flow chart of FIG. 10, there will be a shift boundary line switching routine executed by the transmission controller 78 to select the shift-down boundary line to be used by the shift control means 166. The routine is initiated with step SB1 identical with step SA1 of FIG. 6, to determine whether the turning stability control means 160 is in operation. If a negative decision (NO) is obtained in step SB1, the control flow goes to step SB2 to select the data map B representative of the normal shift-down boundary line.

If an affirmative decision (YES) is obtained in step SB1, the control flow goes to step SB3 to select the data map A representative of the shift-down boundary line which is used when the turning stability control means 166 is in operation. The 3-2 shift-down boundary line indicated by the solid line in FIG. 9 is an example of the shift-down boundary line represented by the data map A. In the example of FIG. 9, the shift-down boundary line represented by the data map A is located to the left of the normal shift-down boundary line represented by the data map B, so that the shift-down action takes place at a lower vehicle speed V according to the 3-2 shift-down boundary line selected in step SB3, than according to the 3-2 shift-down boundary line selected in step SB2. Accordingly, the frequency of the 3-2 shift-down action of the automatic transmission 14 during operation of the turning stability control means 160 is reduced. Even if the 3-2 shift-down action takes place during operation of the turning stability control means 160, the engine braking force produced by this 3-2 shift-down action or the amount of change of the vehicle drive force caused by the 3-2 shift-down action is relatively small since the 3-2 shift-down action takes place at the relatively low vehicle speed.

It will be understood that steps SB2 and SB3 correspond to the shift point changing means 172.

In the present second embodiment of this invention, the shift-down boundary vehicle speed V determined by the shift-down boundary line is lowered in step SB3 by the shift point changing means 172 when the operation of the turning stability control means 160 is detected in step SB1 by the turning stability control detecting means 164, as compared with the shift-down boundary vehicle speed V used when the turning stability control means 160 is not in operation. Consequently, the frequency of the shift-down actions of the automatic transmission 14 during the operation of the turning stability control means 160 is lowered. In other words, the shift-down actions are less likely to take place while the throttle valve opening $\theta_{TH}$ is reduced by the throttle actuator 54 or the appropriate wheel or wheels is/are braked by the braking device 162, to improve the turning stability of the vehicle, under the control of the turning stability control means 160. Even if the shift-down action takes place during operation of the turning stability control means 160, the engine braking effect produced by this shift-down action does not have an adverse influence on the turning stability of the vehicle. Further, the present arrangement is free from a phenomenon which is unexpected to the vehicle operator upon termination of the turning stability control and which would be encountered with the conventional vehicle control apparatus which is adapted to inhibit a shift-down action of the automatic transmission 14 during the turning stability control operation.

Further, since the shift point changing means 172 (SB3) is arranged to lower the shift-down boundary vehicle speed when the turning stability control means 160 is in operation, the shift-down action if achieved during operation of the turning stability control means 160 would not have a considerably adverse effect on the turning stability of the vehicle, because the vehicle speed at which the shift-down action is achieved when the turning stability control means 160 is in operation is lower than when the turning stability control means 160 is not in operation.

While the presently preferred embodiments of this invention have been described by reference to the accompanying drawings, it is to be understood that the invention may be otherwise embodied.

Figure 6:
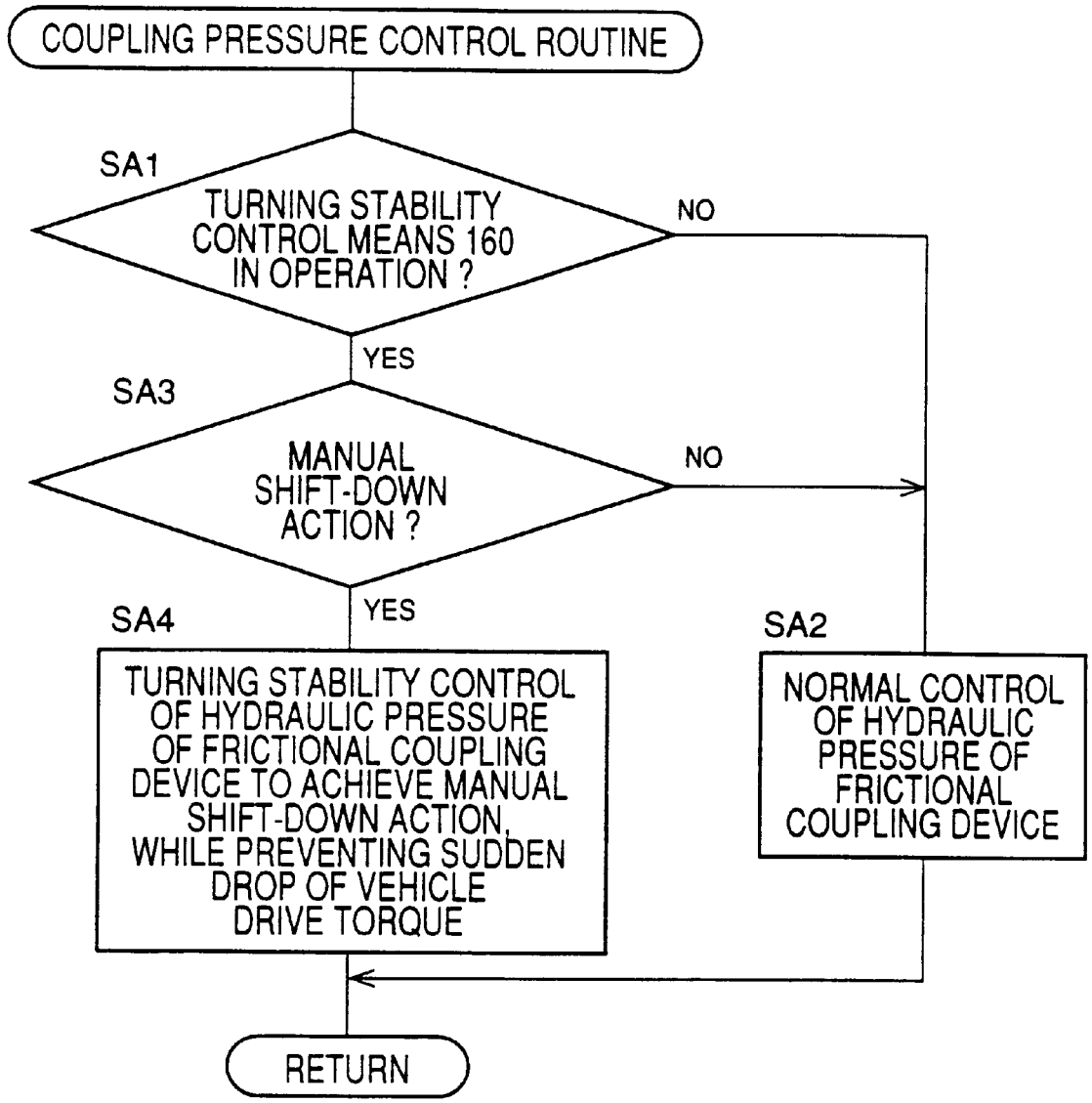
FIG. 6 is a flow chart illustrating an operation of the transmission controller.

In the first embodiment of FIG. 4–7, the coupling pressure control means 168 is adapted to reduce the rate of rise of the hydraulic pressure of the frictional coupling device during the operation of the turning stability control means 160, only when the shift-down action achieved by the frictional coupling device is any one of the manual shift-down actions which take place as a result of the vehicle operator's manipulation of the OVERDRIVE OFF switch, shift lever 72 and accelerator pedal 50 and which may cause a considerably large engine braking effect or an abrupt increase in the engine braking force acting on the drive wheels. However, the coupling control means 168 may be adapted to reduce the rate of rise of the hydraulic pressure of not only the frictional coupling devices which are engaged to achieve the manual shift-down actions, but also the frictional coupling devices which are engaged to achieve the normal shift-down actions which take place depending upon the running condition of the vehicle and according to the shift boundary lines. Any shift-down action of the automatic transmission 14 more or less has an influence on the turning stability of the vehicle, due to a change in the engine braking force or drive torque acting on the vehicle drive wheels, in relation to the friction torque of the engine and the newly established position of the automatic transmission 14. In this case wherein the step SA4 of FIG. 6 is implemented for any shift-down action of the automatic transmission 14 during operation of the turning stability control means 160, the step SA3 and the manual shift-down action detecting means 170 are eliminated.

In the first embodiment, the rate of rise of the hydraulic pressure of the frictional coupling devices during operation of the turning stability control means 160 is lowered only when the frictional coupling devices are engaged for achieving the shift-down actions of the automatic transmission 14. However, the first embodiment may be modified such that the rate of rise of the hydraulic pressure is also when a shift-up action of the the automatic transmission 14 takes place during operation of the turning stability control means 160. In the second embodiment, only the shift-down boundary vehicle speeds are lowered during operation of the turning stability control means 160. However, the second embodiment may be modified such that the shift-up boundary vehicle speeds are raised during operation of the turning stability control means 160. These modifications are effective to improve the turning stability of the vehicle, since any shift-up action of the automatic transmission more or less has an influence on the turning stability of the vehicle, due to a change in the drive torque of the vehicle drive wheels.

Further, the second embodiment may be modified such that the shift-down boundary vehicle speed is lowered during operation of the turning stability control means 160, only when any of the manual shift-down actions takes place. This modification requires the manual shift-down action detecting means 160 as provided in the first embodiment of FIG. 4, and a step (similar to step SA3 of FIG. 6) of determining whether the shift control means 166 has generated a command for achieving any manual shift-down action.

Although the shift point changing means 172 in the second embodiment is adapted to shift the shift-down boundary lines for lowering the shift-down boundary vehicle speeds during operation of the turning stability control means 160, the shift point changing means 172 may be adapted to reduce the detected vehicle speed V by a predetermined amount ΔV, so that the reduced vehicle speed (V−ΔV) is compared with the shift-down boundary vehicle speeds determined by the normal shift-down boundary lines (as represented by the data map B of FIG. 8).

It is to be understood that the present invention may be embodied with various other changes, modifications and improvements, which may occur to those skilled in the art departing from the spirit and scope of the invention defined in the following claims:

What is claimed is:

1. An apparatus for controlling an automotive vehicle having an engine and an automatic transmission having a plurality of hydraulically operated frictional coupling devices, said apparatus comprising:

running stability control means operated upon reduction of stability of running of the vehicle below a predetermined threshold, for controlling at least one of an output of said engine and a braking force applied to the vehicle, so as to improve the stability of running of the vehicle;

shift control means for automatically shifting said automatic transmission by engagement of at least one of said plurality of frictional coupling device, depending upon a detected running condition of the vehicle:

running stability control detecting means for detecting an operation of said running stability control means; and coupling pressure control means for controlling a hydraulic pressure to be applied to a selected one of said plurality of hydraulically operated frictional coupling devices, which is engaged to shift said automatic transmission under the control of said shift control means, such that a rate of rise of said hydraulic pressure is lower when the operation of said running stability control means is detected by said running stability control detecting means, than when said operation of said running stability control means is not detected.

2. An apparatus according to claim 1, wherein said running stability control means comprises turning stability control means for controlling at least one of the output of said engine and said braking force applied to the vehicle, for improving stability of running of the vehicle.

3. An apparatus according to claim 1, further comprising shift-down action detecting means for determining whether said shift control means has commanded said automatic transmission to achieve a shift-down action by engagement of said selected one of said frictional coupling devices, and wherein said coupling pressure control means is operated to control the hydraulic pressure to be applied to said selected one of said frictional coupling devices, when said shift-down action detecting means determines that said shift control means has commanded said automatic transmission to achieve said shift-down action.

4. An apparatus according to claim 3, wherein said shift-down action detecting means comprises manual shift-down action detecting means for determining whether said shift control means has commanded said automatic transmission to achieve a manual shift-down action by engagement of said selected one frictional coupling device, in response to manipulation of a manually operated member of an operator of the automotive vehicle.

5. An apparatus according to claim 4, wherein said manually operated member is a shift lever operable to change the number of forward-drive operating positions of said automatic transmission to which said automatic transmission can be shifted.

6. An apparatus according to claim 1, wherein said coupling pressure control means delays a rise of the hydraulic pressure to be applied to said selected one of said frictional coupling devices, when the operation of said running stability control means is detected by said running stability control detecting means, with respect to a rise said hydraulic pressure when the operation of said running stability control means is not detected.

* * * * *